United States Patent [19]

Uchino

[11] Patent Number: 5,576,944
[45] Date of Patent: Nov. 19, 1996

[54] PLURAL PARALLEL BRIDGE INVERTER POWER CONVERSION SYSTEM WITH BALANCED DC INPUT CURRENTS

[75] Inventor: Hiroshi Uchino, Tokyo, Japan

[73] Assignee: Kabushiki Kaisha Toshiba, Kawasaki, Japan

[21] Appl. No.: 382,585

[22] Filed: Feb. 2, 1995

[30] Foreign Application Priority Data

Feb. 28, 1994 [JP] Japan .................... 6-030290

[51] Int. Cl.$^6$ .................................................. H02M 7/521
[52] U.S. Cl. .................... 363/71; 363/96; 363/137
[58] Field of Search ................... 363/71, 95, 96, 363/98, 132, 135, 136, 137

[56] References Cited

U.S. PATENT DOCUMENTS

| | | | |
|---|---|---|---|
| 4,268,900 | 5/1981 | Hirata | 363/71 |
| 4,276,589 | 6/1981 | Okawa et al. | 363/137 |
| 5,070,440 | 12/1991 | Walker | 363/96 |

OTHER PUBLICATIONS

"Multimodular Current–Source SPWM Converters For Superconducting A Magnetic Energy Storage System"; IEEE Transaction On Power Electronics, vol. 8, No. 3, Jul. 1993; pp. 250–256; Zhong–Chao Zhang, et al.

Primary Examiner—Jeffrey L. Sterrett
Attorney, Agent, or Firm—Oblon, Spivak, McClelland, Maier & Neustadt, P.C.

[57] ABSTRACT

A power conversion system including a DC power source, a plurality of unit converters connected in parallel, each composed of a bridge connected switching devices, a plurality of DC reactors and a control circuit. The control circuit includes a conduction arm number calculating circuit for determining conduction arm numbers of the unit converters of each phase, each being determined based on a ratio of the current instruction value of respective phase and a mean value of the DC currents. The control circuit further includes a current balance control circuit for generating a plurality of conduction instructions for the switching devices at a time of change of one of the conduction arm numbers based on a first order of magnitude of the AC voltages, a second order of magnitude of the DC currents and the conduction arm numbers of each phase at that point. The conduction instructions are applied to the unit converters for switching ON or OFF the switching devices, thereby balance control of the DC currents of the unit converters is exercised.

5 Claims, 14 Drawing Sheets

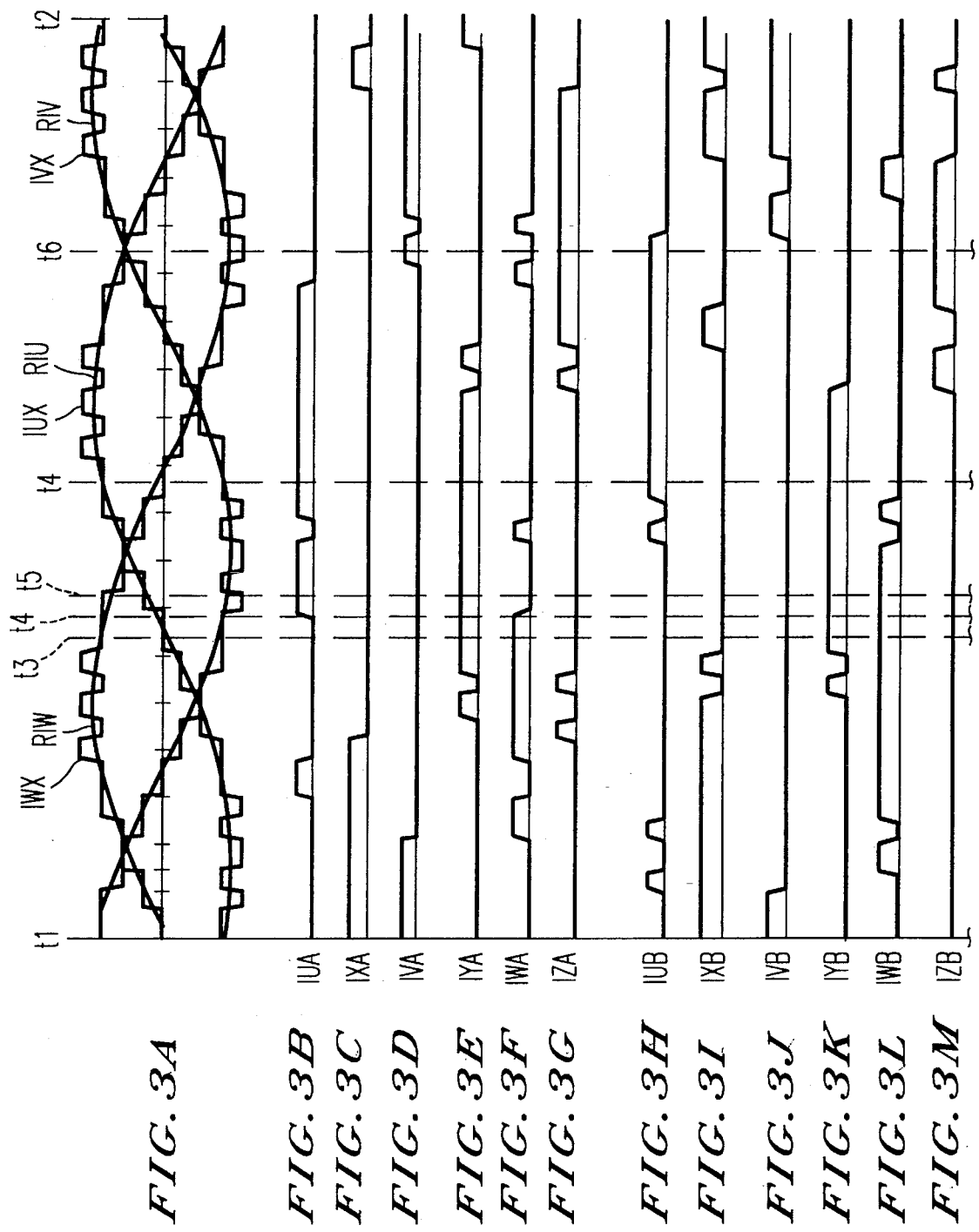

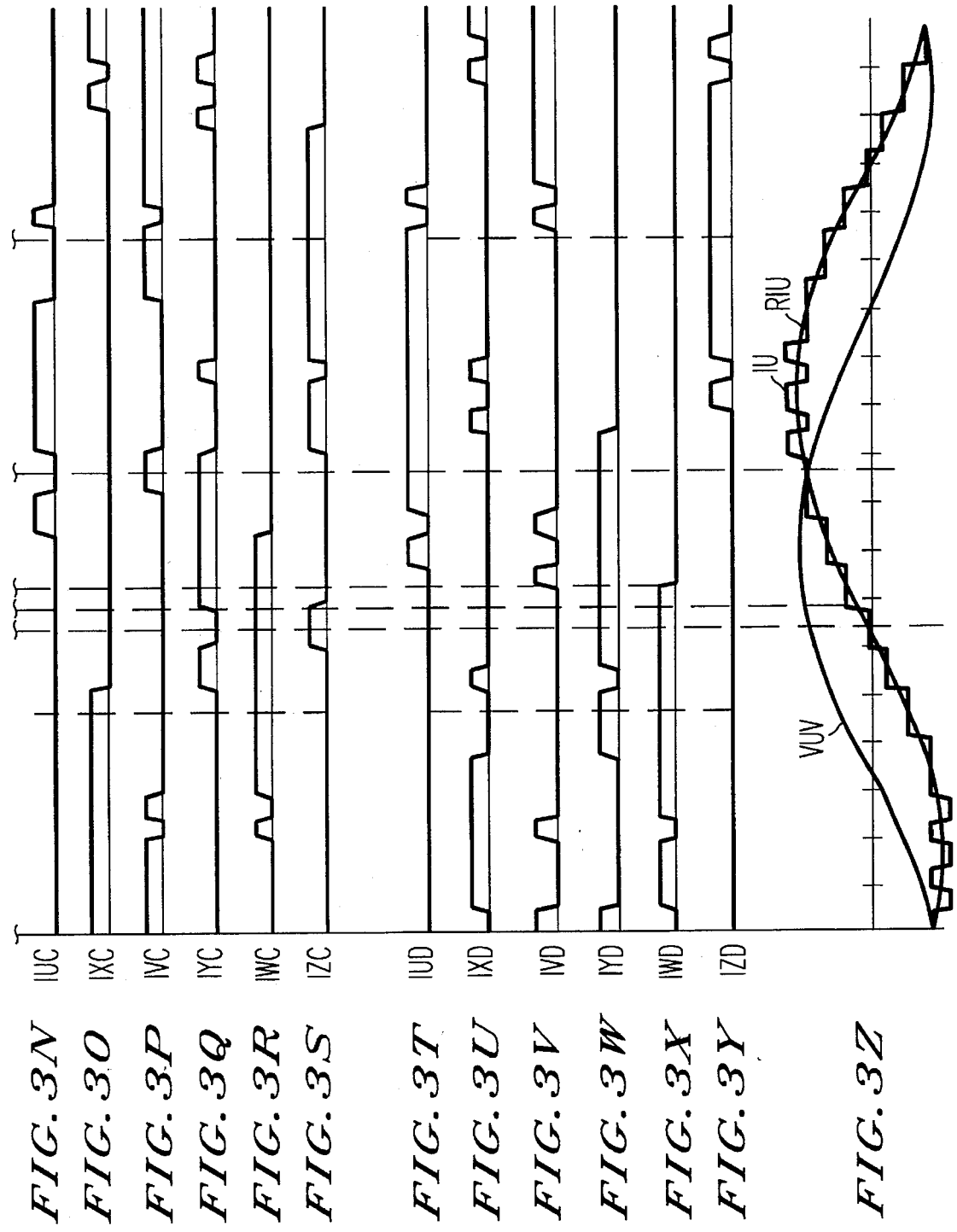

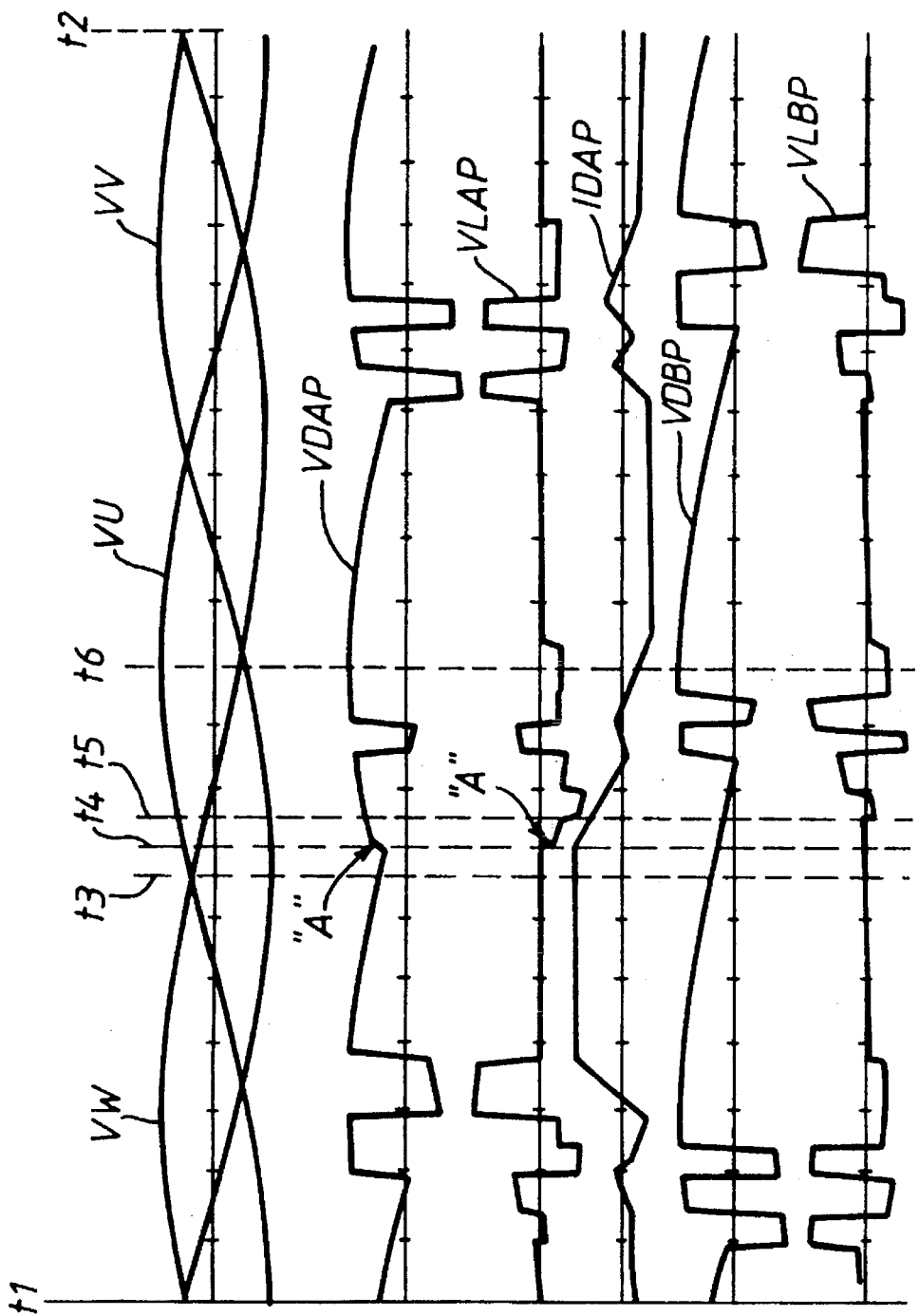

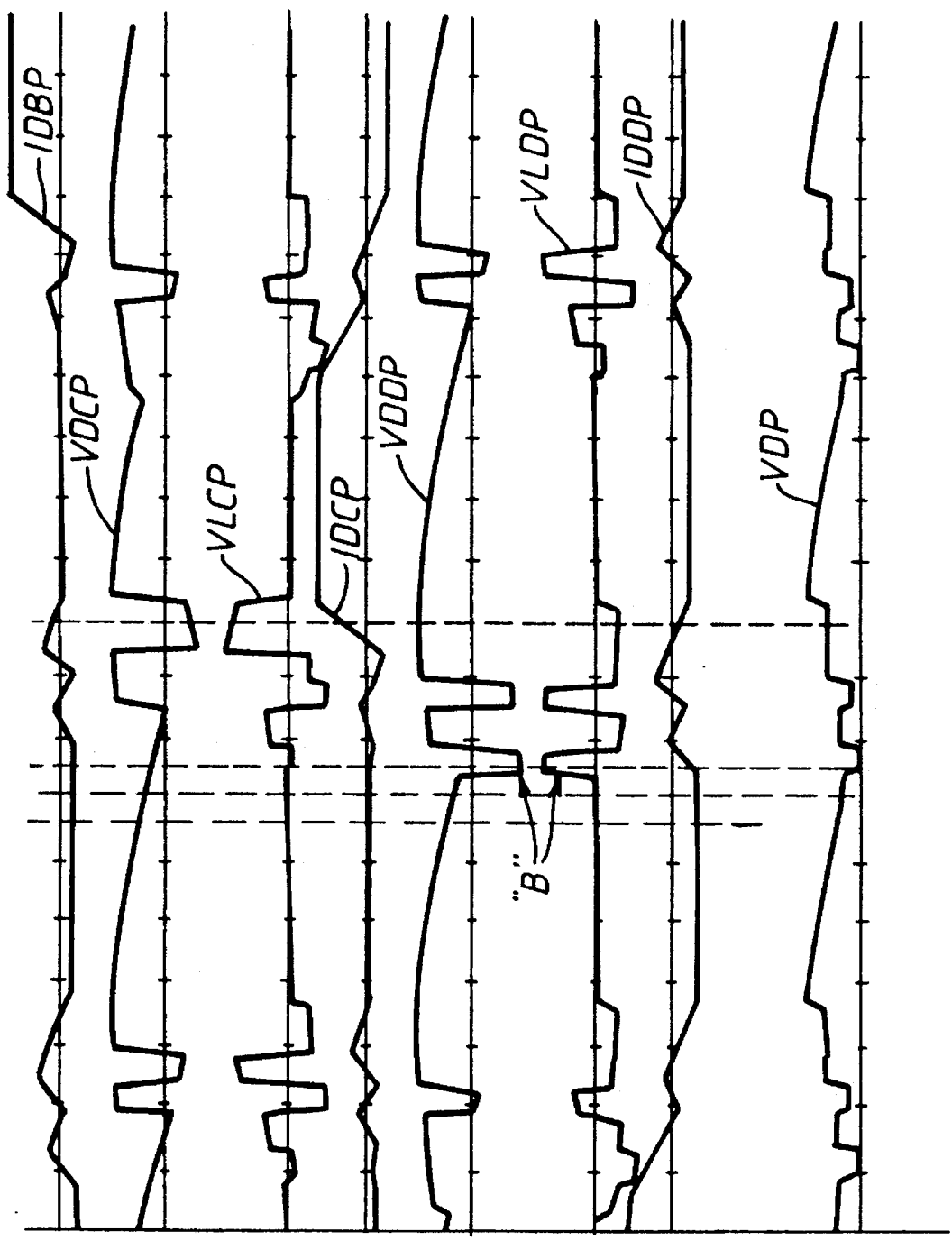

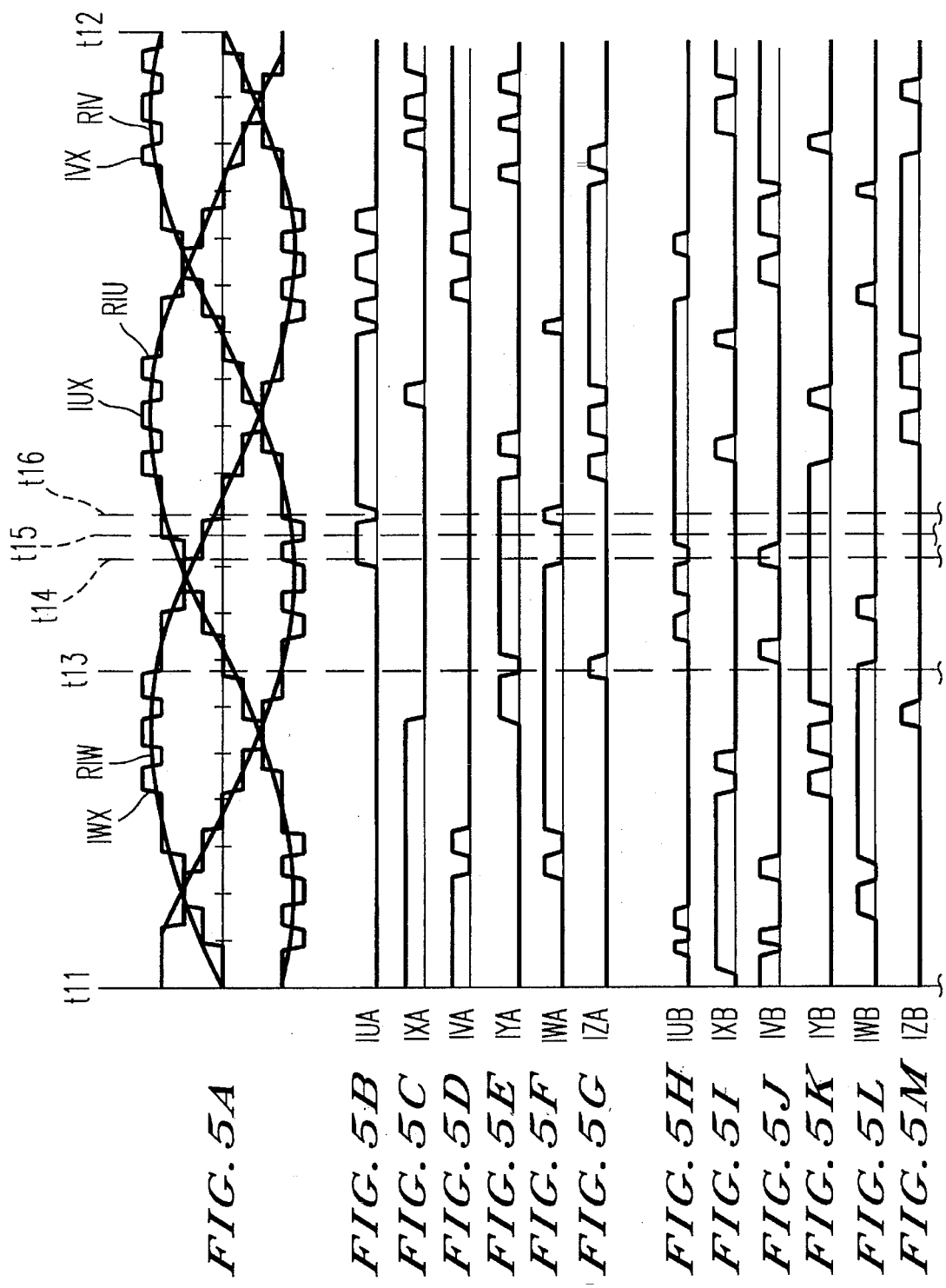

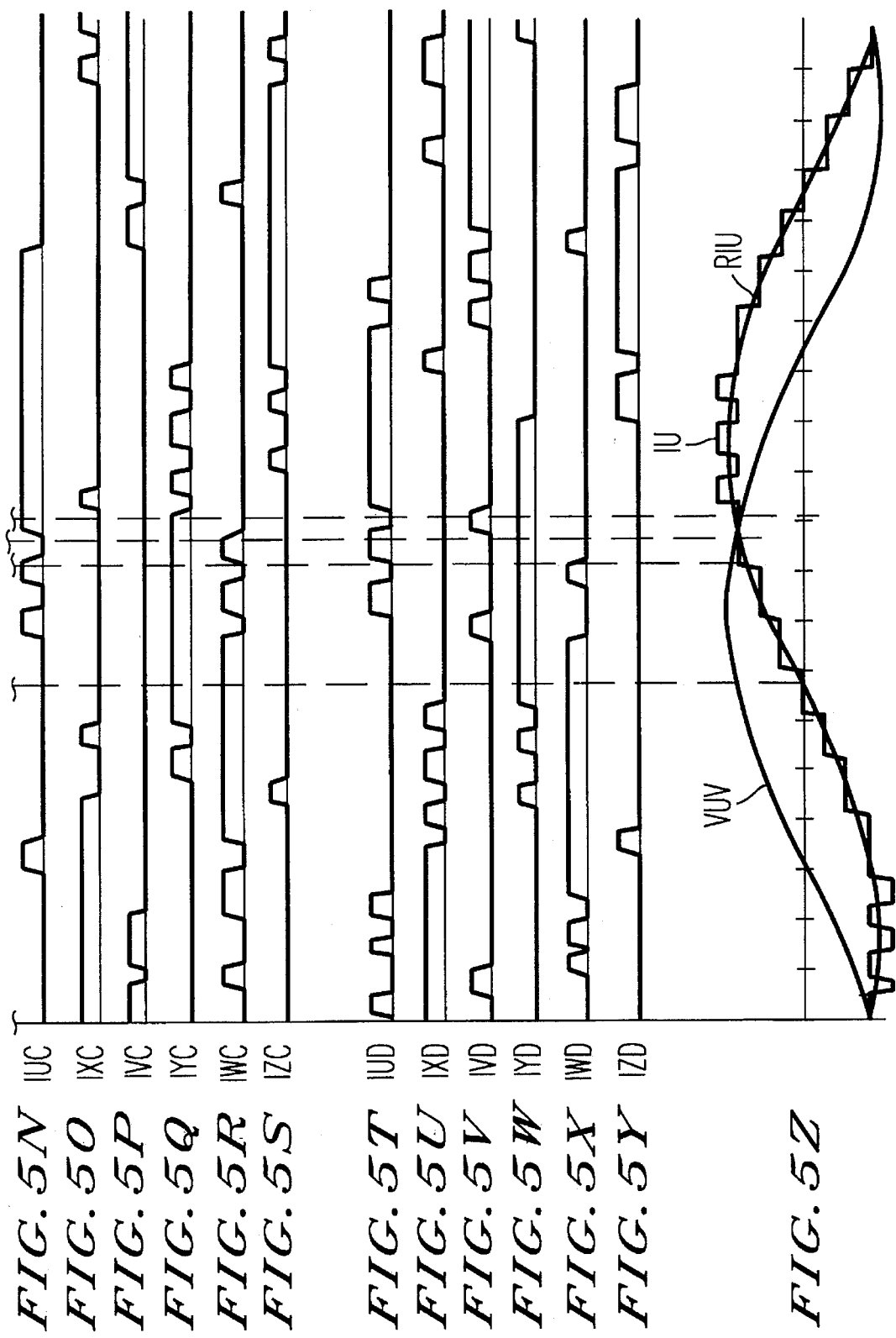

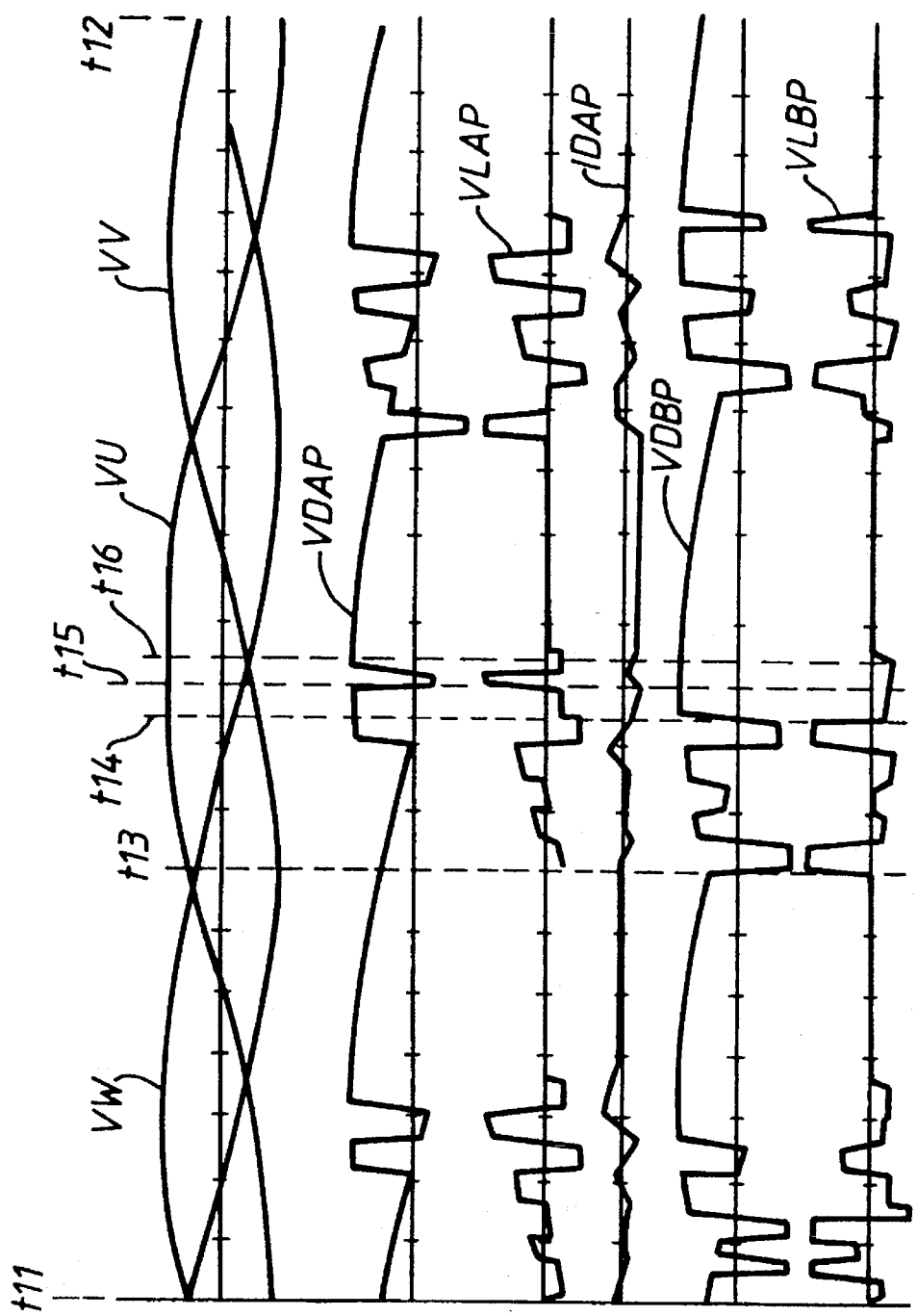

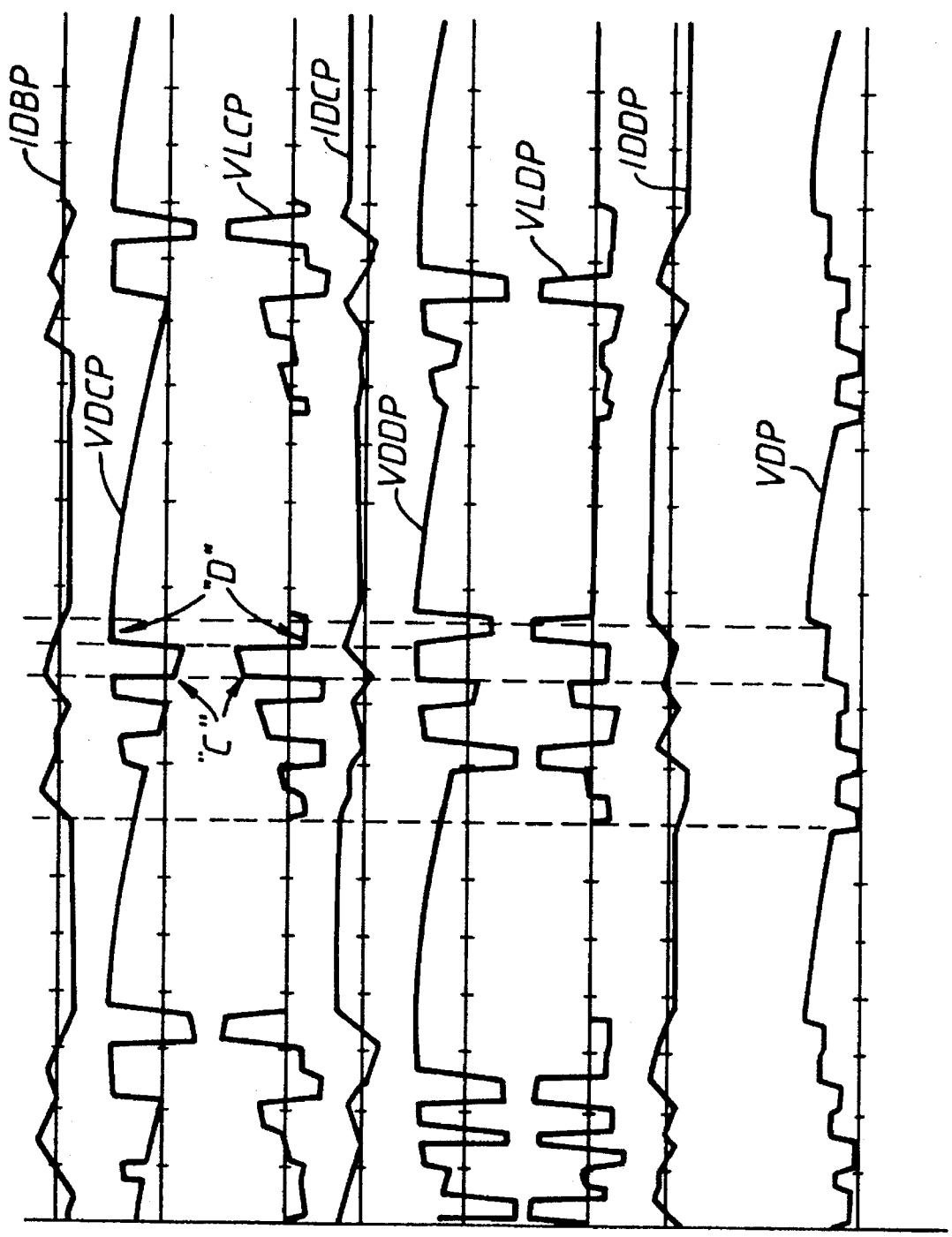

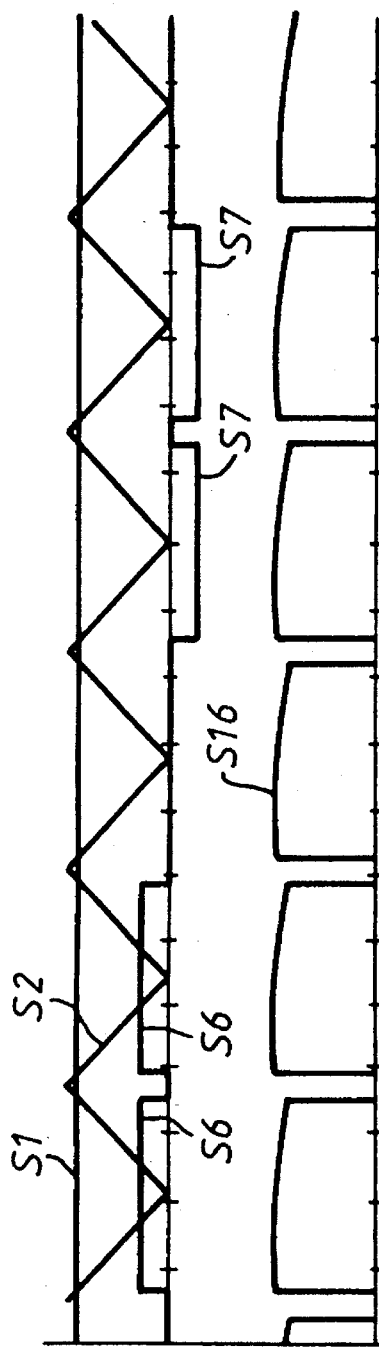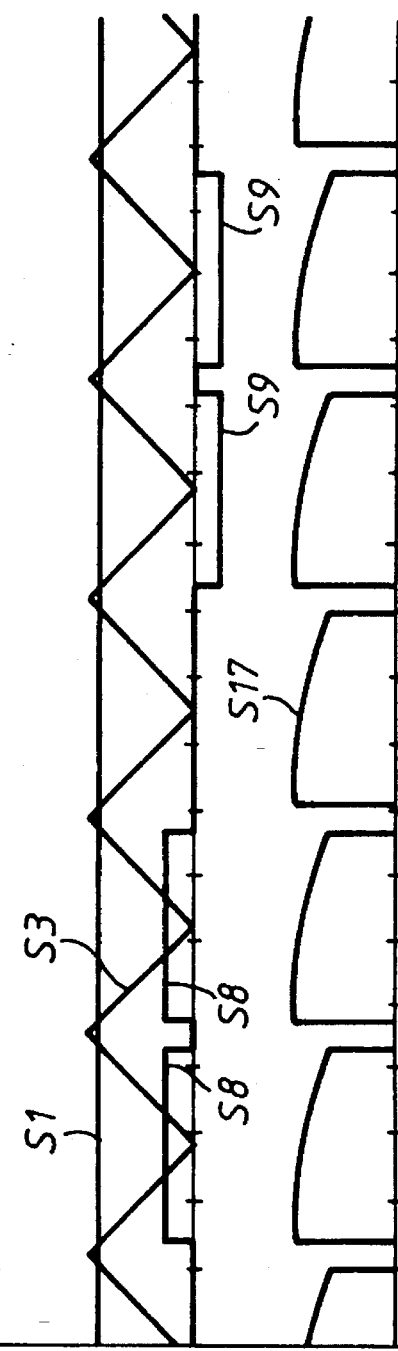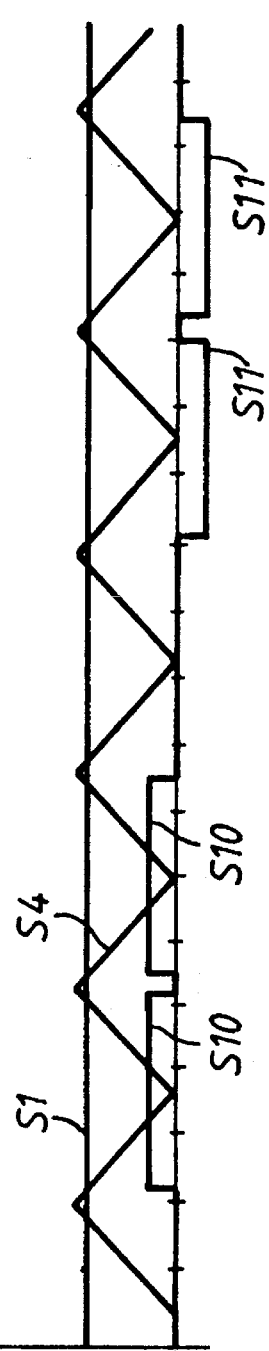
FIG. 9A PRIOR ART
FIG. 9B PRIOR ART
FIG. 9C PRIOR ART
FIG. 9D PRIOR ART
FIG. 9E PRIOR ART

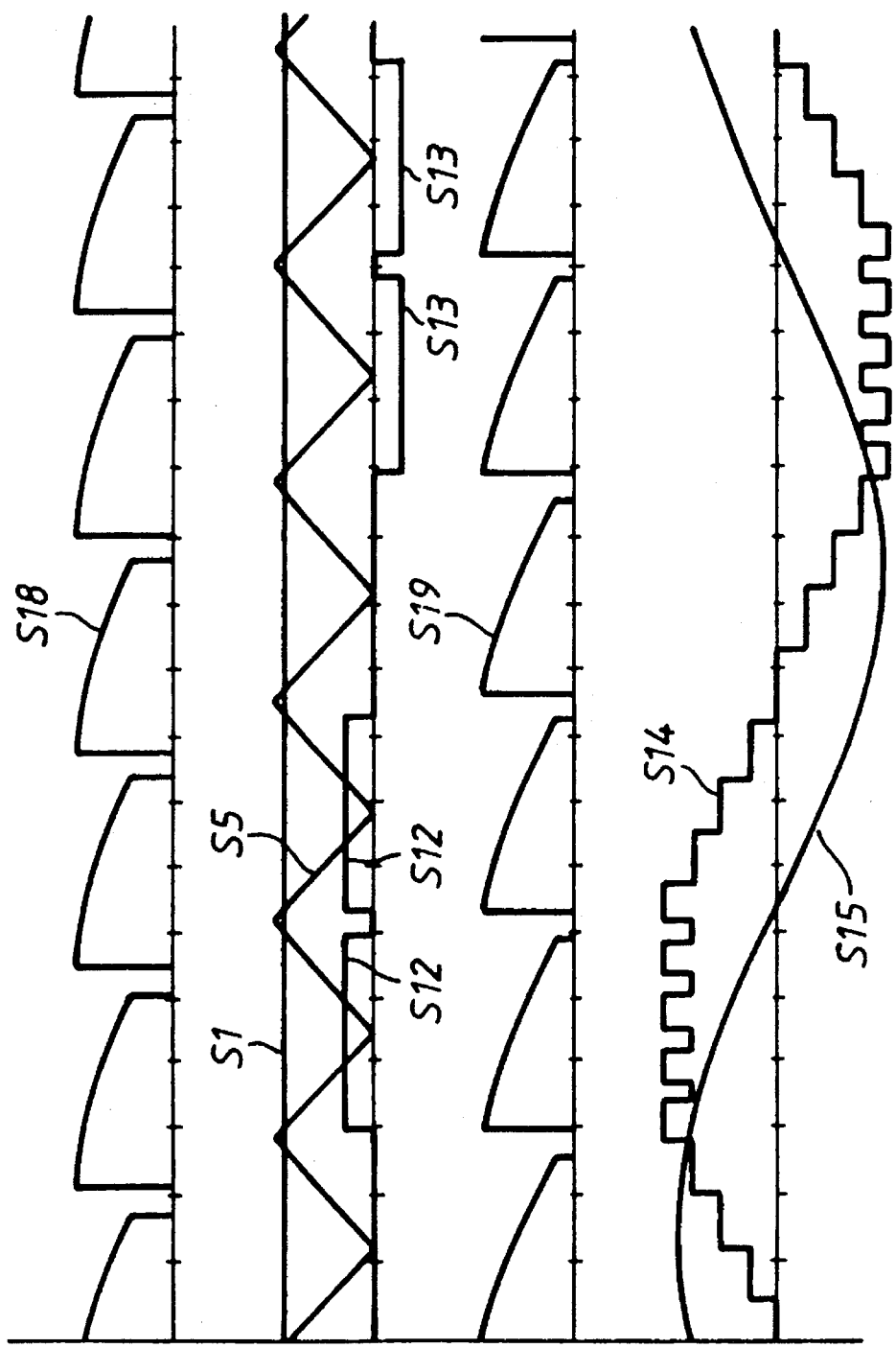

PLURAL PARALLEL BRIDGE INVERTER POWER CONVERSION SYSTEM WITH BALANCED DC INPUT CURRENTS

BACKGROUND OF THE INVENTION

1. Field of the Invention

This invention relates to a power conversion system, and more particularly to a power conversion system wherein a plurality of unit converters are operated connected in parallel.

2. Description of the Related Art

FIG. 7 is a layout diagram of the main circuitry of one example of a prior art power conversion system. In this FIG., 1 is an AC load, and 2 to 4 are capacitors. 5 to 8 are unit converters, each of which converts a DC power to an AC power. Their respective AC terminals are connected in common, being connected to AC load 1 so as to perform parallel operation. Capacitors 2 to 4 are employed to absorb the switching surges of converters 5 to 8. 9 to 32 are self-turn-off switching devices that constitute converters 5 to 8. Hereinbelow, the case where gate turn-off thyristors (hereinbelow simply called GTOs) are employed as the self-turn-off switching devices is described. 33 to 40 are DC reactors for smoothing the DC current. 41 to 44 are DC power sources.

FIG. 8 is a layout diagram of the control circuit that controls the main circuit of FIG. 7. In this FIG., 59 is a current instruction value generating circuit for converters 5 to 8. 60 is a phase detection circuit. 61 is a triangular wave generator. 62 is a comparator. 63 is a logic circuit that generates an output instruction of AC currents of converters 5 to 8.

FIG. 9 is a waveform diagram given in explanation of the operation of the prior art example. Hereinbelow, the operation of the prior art example will be described with reference to FIG. 7 to FIG. 9. In FIG. 8, current instruction value generating circuit 59 generates an amplitude instruction value S1 and a phase angle instruction value of the AC current. Amplitude instruction value S1 is supplied to comparator 62.

Phase angle instruction value is supplied to phase detection circuit 60 and triangular wave generator 61. Signals S2 to S5 are the output signals of triangular wave generator 61, and are triangular waves Whose period is 60° of the phase angle instruction value. Triangular waves S3 to S5 lag in phase by 15° in each case respectively with respect to triangular wave S2, for improving the waveform of the AC output currents of the power conversion system composed of multiple converters 5 to 8. Comparator 62 compares amplitude instruction value S1 with triangular waves S2 to S5; the range in which amplitude instruction value S1 is larger than triangular waves S2 to S5 is taken as the output instruction for the AC current. Output instruction from comparator 62 and output of phase detection circuit 60 are supplied to logic circuit 63, which Generates output instructions S6 to S13 of the AC currents of each of converters 5 to 8 by phase discrimination using the output of phase detection circuit 60.

In more detail, S6 is a U-phase output instruction of converter 5. S7 is an X-phase output instruction of converter 5. S8 is a U-phase output instruction of converter 6. S9 is an X-phase output instruction of converter 6. S10 is a U-phase output instruction of converter 7. S11 is an X-phase output instruction of converter 7. S12 is a U-phase output instruction of converter 8. S13 is an X-phase output instruction of converter 8.

The GTOs 9 to 32 of converters 5 to 8 are on/off controlled in accordance with the above output instructions S6 to S13, so that a squarewave waveform current as shown at S14 in FIG. 9 is obtained as the U-phase output current. S15 is a UV-phase line voltage of AC load 1. Control is exercised in like manner for the V-phase and W-phase, delaying the phase by 120° in each case with respect to the U-phase. S16 to S19 are DG voltages of the converters 5 to 8 when operation is conducted as above. S16 is a DC voltage of converter 5, S17 is a DC voltage of converter 6, S18 is a DC voltage of converter 7, and S19 is a DC voltage of converter 8.

However, when operation is conducted with the AC terminals of converters 5 to 8 connected in parallel and their conduction phases offset by 15° in each case, as described above, the mean values of the DC voltages S16 to S19 of converters 5 to 8 are not equal as shown in FIG. 9. Moreover, it is necessary to provide DC power sources 41 to 44 independently for each of converters 5 to 8, so that the DC power source circuitry is complicated.

SUMMARY OF THE INVENTION

Accordingly, one object of this invention is to provide a power conversion system composed of a plurality of unit converters connected in parallel in which DC currents of the unit converters can be balanced.

Another object of this invention is to provide a power conversion system composed of a plurality of unit converters connected in parallel which can simplify the DC power source circuitry.

These and other objects of this invention can be achieved by providing a power conversion system including a DC power source, a plurality of unit converters, a plurality of DC reactors and a control circuit. Each of the unit converters is composed of a bridge connected switching devices for converting a DC power to an AC power. Each of the DC reactors is provided between the DC Dower source and one of the unit converters, respectively. Each of the unit converters has DC terminals connected to the DC power source through one of the DC reactors, respectively, and has AC terminals of each phase. The AC terminals of each phase of the unit converters are connected in common and are adapted for connecting to an AC load. The control circuit includes a current instruction value Generating circuit for generating current instruction values of each phase for AC output currents of each phase of the power conversion system, an AC voltage detection unit for detecting AC output voltages of each phase of the power conversion system, and a DC current detection unit for detecting a plurality of DC currents, each flowing between the DC power source and one of the unit converters, respectively. The control circuit also includes a conduction arm number calculating circuit for determining conduction arm numbers of the unit converters of each phase, each being determined based on a ratio of the current instruction value of respective phase and a mean value of the DC currents. The control circuit further includes a current balance control circuit connected to receive the conduction arm numbers from the conduction arm number calculating circuit, the AC output voltages from the AC voltage detection unit, and the DC currents from the DC current detection unit, for generating a plurality of conduction instructions for the switching devices at a time of change of one of the conduction arm numbers based on a first order of magnitude of the AC voltages, a second order of magnitude of the DC currents and the conduction arm numbers of each phase at that point. The conduction instructions are applied to the unit converters for switching ON or OFF the switching devices, thereby balance control of the DC currents of the unit converters is exercised.

With the above arrangement, every time one of the conduction arm numbers of each phase is changed, the DC current values of each unit converter and the AC voltages of each phase are arranged in order of magnitude, respectively. Thus, the current balance control circuit outputs conduction instructions based on the orders of magnitudes in which these are arranged and the conduction arm numbers of each phase at that time. The switching devices in each unit converter are on/off controlled in accordance with the conduction instructions, so that the DC currents of the plurality of unit converters as a whole is balanced.

BRIEF DESCRIPTION OF THE DRAWINGS

A mope complete appreciation of the invention and many of the attendant advantages thereof will be readily obtained as the same becomes better understood by reference to the following detailed description when considered in connection with the accompanying drawings, wherein:

FIG. 3 is a waveform diagram given in explanation of the operation of an embodiment of this invention;

FIG. 4 is a waveform diagram given in explanation of the operation of an embodiment of this invention;

FIG. 5 is a waveform diagram given in explanation of the operation of another embodiment of this invention;

FIG. 6 is a waveform diagram given in explanation of the operation of another embodiment of this invention;

FIG. 9 is a waveform diagram given in explanation of the operation of the prior art example shown in FIGS. 7 and 8.

DETAILED DESCRIPTION OF THE PREFERRED EMBODIMENTS

Figure 1:
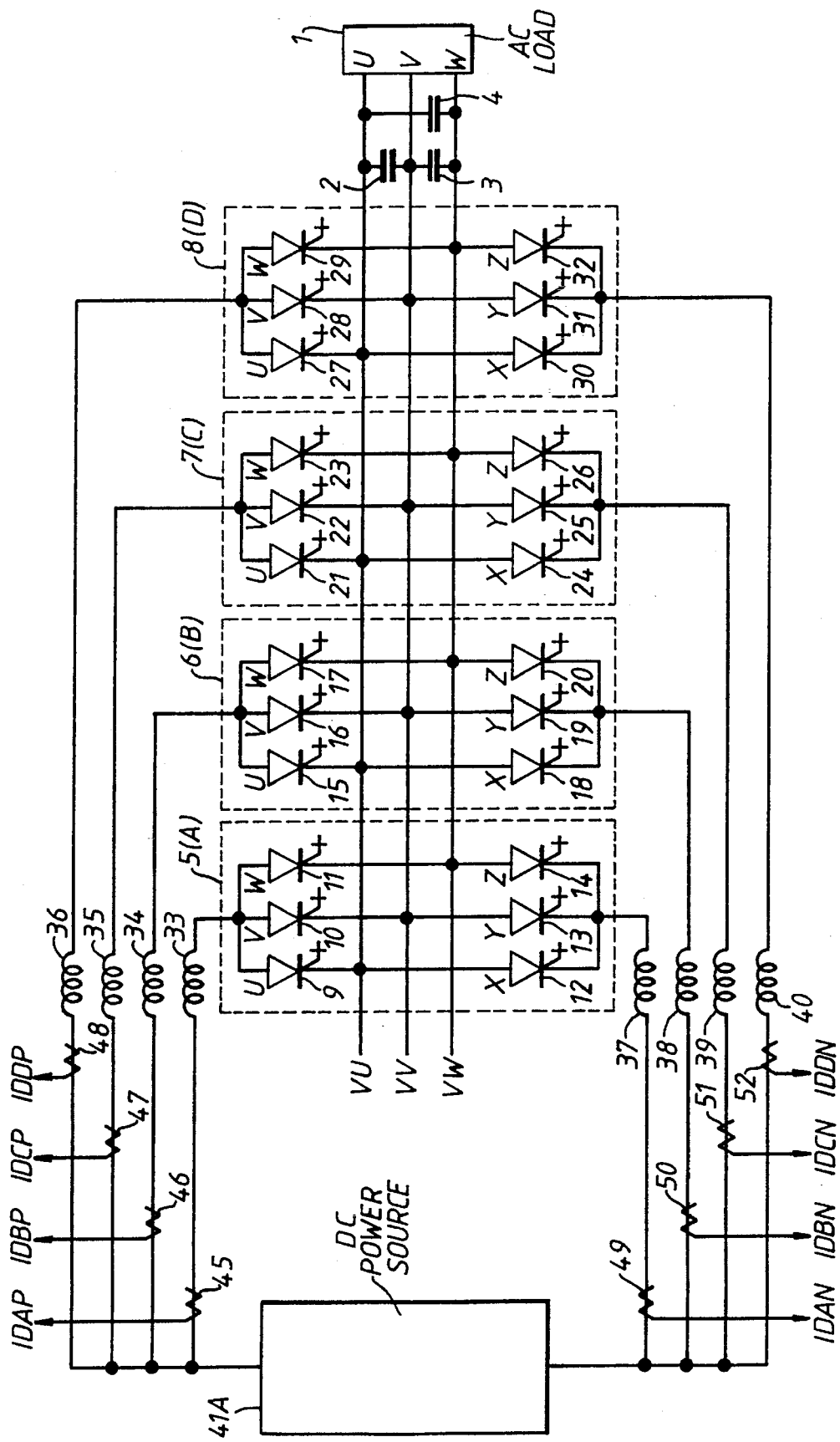
FIG. 1 is a layout diagram of a main circuitry of a power conversion system according to an embodiment of this invention.

Referring now to the drawings, wherein like reference numerals designate identical or corresponding parts throughout the several views, the embodiments of this invention will be described below.

Figure 7:
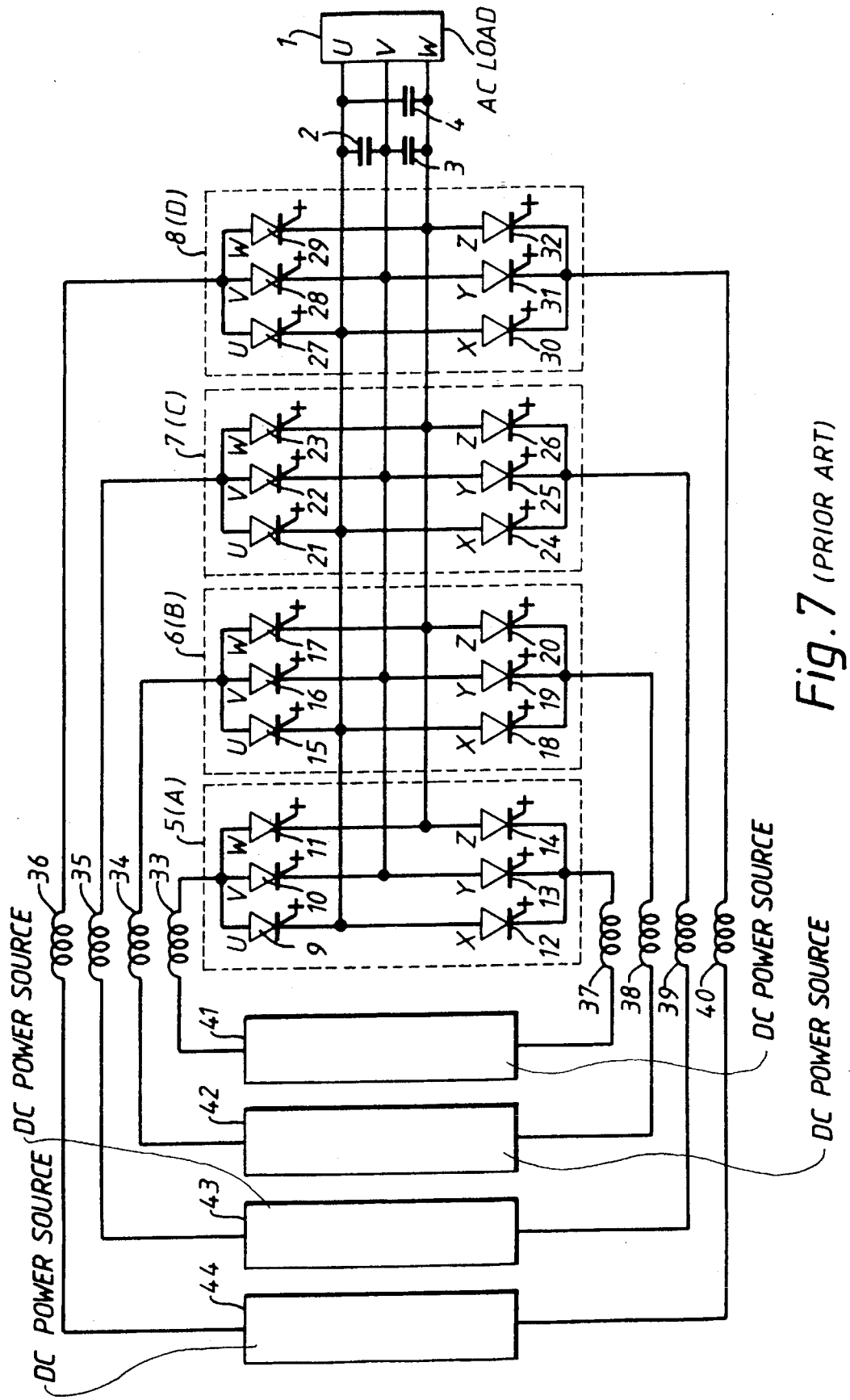
FIG. 7 is a layout diagram of a main circuitry of one example of a prior art power conversion system.

FIG. 1 is a layout diagram of the main circuitry of a power conversion system according to an embodiment of this invention. In this FIG., 1 to 40 are the same as items with the same symbols in the layout diagram of the main circuitry of the prior art example described with reference to FIG. 7, so duplicated description is omitted. 41A is a DC power source provided instead of DC power sources 41 to 44. 45 to 52 are current detectors.

Figure 2:
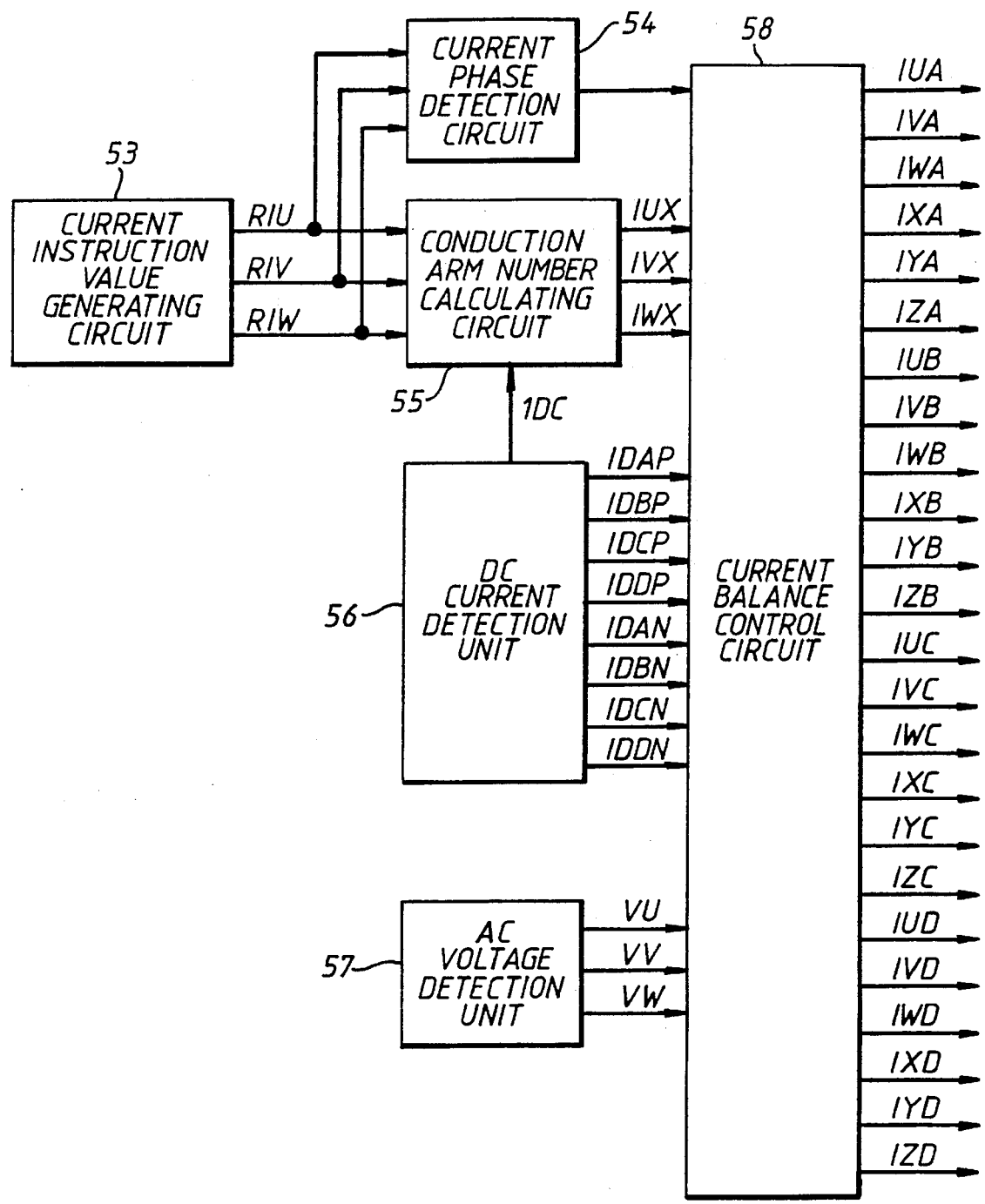
FIG. 2 is a layout diagram of a control circuit which performs control of the main circuit shown in FIG. 1.

FIG. 2 is a layout diagram of the control circuit of a power conversion system according to an embodiment of this invention, which performs control of the main circuit shown in FIG. 1. In FIG. 2, 53 is a current instruction value Generating circuit that supplies instruction values of the AC output currents of unit converters 5 to 8 operated in parallel. 54 is a current phase detection circuit that detects the phase of the current instruction values. 55 is a conduction arm number calculating circuit that calculates the numbers of conduction arms of each phase of the unit converters 5 to 8 based on the instruction values of the AC currents of unit converters 5 to 8. 56 is a DC current detection unit that detects the magnitudes of the DC currents of unit converters 5 to 8. 57 is an AC voltage detection unit that detects the voltages of each phase of AC load 1. 58 is a current balance control circuit that exercises control such that the magnitudes of the DC currents flowing in each of unit converters 5 to 8 are equal, based on the phase of the current instruction values the number of conduction arms of each phase of unit converters 5 to 8, the magnitudes of the DC currents of unit converters 5 to 8, and the voltages of each phase of AC load 1.

The detection and calculation processes performed by each of these circuits or units are executed by a microcomputer.

Next, the operation of this embodiment constituted as described above will be described with reference to the waveform diagrams of FIG. 3 and FIG. 4. FIG. 3 and FIG. 4 show the operational waveforms of different portions of unit converters 5 to 8 at the same timing during the period from a time point t1 to a time point t2.

To facilitate understanding of the description, converter 5 will be called converter A, converter 6 will be called converter B, converter 7 will be called converter C, and converter 8 will be called converter D, as shown in FIG. 1. Also, the symbols of the positive arms of each of converters 5 to 8 will be specified as U, V, and W, while the symbols of the negative arms thereof will be specified as X, Y and Z, as shown in FIG. 1.

In FIG. 1 to FIG. 4, RIU, RIV and RIW are outputs of current instruction value generating circuit 53, and are applied to current phase detection circuit 54 and conduction arm number calculating circuit 55. RIU is a U-phase current instruction value, RIV is a V-phase current instruction value, and RIW is a W-phase current instruction value. IUX, IVX, and IWX are outputs of conduction arm number calculating circuit 55, and show the numbers of conduction arms of U, V and W phases, respectively. IUX, IVX and IWX are instruction values of the conduction arm numbers corresponding to current instruction values RIU, RIV and RIW, respectively. Conduction number instruction values IUX, IVX and IWX are applied to current balance control circuit 58.

IDAP to IDDN are the detection values of the DC current of unit converters 5 to 8, which are detected by current detectors 45 to 52, respectively. IDAP is a positive side DC current of converter A, IDBP is a positive side DC current of converter B, IDCP is a positive side DC current of converter C, and IDDP is a. positive side DC current of converter D. IDAN is a negative side DC current of converter A, IDBN is a negative side DC current of converter B, IDCN is a negative side DC current of converter C, and IDDN is a negative side DC current of converter D. The detection values IDAP to IDDN are applied to current balance control circuit 58.

It should be noted that, since this invention has the object of exercising balance control such that the DC currents IDAP to IDDN are equal, and is characterized in that selection control is performed of the conduction arms of converters A to D in accordance with the magnitudes of DC currents IDAP to IDDN. In order to facilitate understanding of the description, the waveforms of DC currents IDAP, IDBP, IDCP and IDDP of FIG. 4 are shown with their deviations with respect to the mean value magnified by a factor of 20. VU, VV and VW are phase voltages of AC load 1 and these voltages are detected by voltage detectors (not shown). VU is a U-phase voltage, VV is a V-phase voltage, and VW is a W-phase voltage. Also, VUV is a line voltage between the U-phase and V-phase of AC load 1.

IUA to IZD are the outputs of current balance control circuit 58. IUA, IVA, IWA, IXA, IYA, and IZA are conduction instructions of the U, V, W, X, Y and Z phase arms of converter A, respectively. IUB, IVB, IWB, IXB, IYB and IZB are conduction instructions of the U, V, W, X, Y and Z phase arms of converter B, respectively. IUC, IVC, IWC, IXC, IYC and IZC are conduction instructions of the U, V, W, X, Y and Z phase arms of converter C, respectively. IUD, IVD, IWD, IXD, IYD and IZD are conduction instructions of the U, V, W, X, Y and Z phase arms of converter D. VDAP is a positive DC voltage of converter A, VDBP is a positive DC voltage of converter B, VDCP is a positive DC voltage of converter C and VDDP is a positive DC voltage of converter D, and these voltages are detected by voltage detectors (not shown). The negative DC voltages VDAN to VDDN of converters A to D detected by voltage detectors (not shown) are not shown in FIGS. 3 and 4.

VLAP is a voltage applied to DC reactor 33, VLBP is a voltage applied to DC reactor 34, VLCP is a voltage applied to DC reactor 35, and VLDP is a voltage applied to DC reactor 36, and these voltages are detected by voltage detectors (not shown). Voltages VLAN to VLDN applied to DC reactors 37 to 40 detected by voltage detectors (not shown) are not shown in FIGS. 3 and 4.

VDP is a mean value of positive DC voltages VDAP to VDDP of converters A to D. The following relationship exists:

VLAP=VDP−VDAP

VLBP=VDP−VDBP

VLCP=VDP−VDCP

VLDP=VDP−VDDP

Conduction arm number calculating circuit 55 generates conduction number instruction value IUX of the U-phase by carrying out the following calculation. IDC is a mean value of positive side DC currents IDAP to IDDP or negative side DC currents IDAN to IDDN. Mean value IDC is applied to conduction arm number calculating circuit 55 from DC current detection unit When IRU/IDC<−3.5, IUX=−4

When−3.5≦RIU/IDC<−2.5, IUX=−3

When−2.5≦RIU/IDC<−1.5, IUX=−2

When−1.5≦RIU/IDC<−0.5, IUX=−1

When−0.5≦RIU/IDC<0.5, IUX=−0

When0.5≦RIU/IDC<1.5, IUX=−1

When1.5≦RIU/IDC<2.5, IUX=−2

When2.5≦RIU/IDC<3.5, IUX=−3

When3.5≦RIU/IDC, IUX=4

Conduction number instruction value IVX of the V-phase, and conduction number instruction value IWX of the W-phase are found based on current instruction values RIV, RIW and mean value IDC, respectively, in the same way, as in the U-phase described above.

These conduction number instruction values IUX, IVX and IWX are applied to current balance control circuit 58.

(1) Control of the Phase Whose Current is the Maximum

Current phase detection circuit 54 detects the phase of the current every 60° at which the absolute value of RIU, the absolute value or RIV or the absolute value or RIW is a maximum. For example, during the period from a time point t3 to a time point t6 in FIG. 3, the absolute value of V-phase current instruction value RIV is a maximum and V-phase current instruction value RIV is negative. Current balance control circuit 58 generates a conduction instruction as follows in accordance with the output signal of current phase detection circuit 54, including a maximum phase at which the absolute value of the current instruction value is a maximum and a polarity of the current instruction value of the maximum phase.

|RIV|:max., RIV<0  (a)

Signals IYA, IYB, IYC and IYD are made "1" with the timing of the change of signal IWX or signal IUX, causing arm Y of converter A, arm Y of converter B, arm Y of converter C and arm Y of converter D to conduct. That is, at time point t4, when IUX changes from 0 to 1, IYC is changed from "0" to "1". IYA, IYB and IYD are already "1"0 at time point t4, and so remain unchanged.

The same operation is performed in respect of the other periods, every 60°, continuing through the period from time point t3 to time point t6. Current balance control circuit 58 generates conduction instructions as follows:

|RIU|:max., RIU>0  (b)

Signals IUA, IUB, IUC and IUD are made "1" with the timing of Change of signal IVX or signal IWX, causing arm U of converter A, arm U of converter B, arm U of converter C and arm U of converter D to conduct.

|RIW|:max., RIW<0  (c)

signals IZA, IZB, IZC and IZD are made "1" with the timing at which signal IUX or signal IVX changes, causing arm Z of converter A, arm Z of converter B, arm Z of converter C, and arm Z of converter D to conduct.

|RIV|:max., RIV<0  (d)

Signals IVA, IVB, IVC and IVD are made "1" with the timing at which signal IWX or signal IUX changes, causing arm V of converter A, arm V of converter B, arm V of converter C, and arm V of converter D to conduct.

|RIV|:max., RIV<0  (e)

Signals IXA, IXB, IXC and IXD are made "1" with the timing at which signal IVX or signal IWX changes, causing arm X of converter A, arm X of converter B, arm X of converter C, and arm X of converter D to conduct.

|RIW|:max., RIW<0  (f)

Signals IWA, IWB, IWC and IWD are made "1" with the timing at which signal IUX or signal IVX changes, causing arm W of converter A, arm W of converter B, arm W of converter C, and arm W of converter D to conduct.

(2) Balance Control of DC Current

Current balance control circuit 58 controls as follows. Every time one of conduction number instruction values IUX, IVX, IWX change, AC voltages VU, VV, VW and positive side DC currents IDAP to IDDP are arranged in order of magnitude, respectively. Arms which conduct are selected in accordance with conduction numbers IUX, IVX, IWX of each phase, the order of magnitudes of AC voltages VU, VV, VW and the order of magnitudes of positive side DC currents IDAP to IDBP.

For example, during the period from time point t3 to time point t6, control is exercised as follows. At a time point t4, IUX changes from 0 to 1. At this point, IWX is 3. Consequently, the conduction number of U-phases of converters A to D is 1, and the conduction number of W-phases of converters A to D is 3. As for the conduction number of the V-phase, the multiple number of converters A to D is 4 and the sum of the conduction numbers of the U-phase and W-phase is 4, so the conduction number of the V-phase is 0.

The order of the magnitudes of AC voltages VU, VV and VW at this point is then:

VU>VW>VV.

Also, the order of the magnitudes of positive side DC currents IDAP to IDDP is:

IDAP>IDCP>IDBP>IDDP

Balance control of the DC currents can then be performed by making connection from the converter of largest DC current to the phase of largest AC voltage sequentially in accordance with the instruction values of the conduction numbers for each phase. So:

converter A, in which positive side DC current IDAP flows, is connected to the U-phase;

converter C, in which positive side DC current IDCP flows, is connected to the W-phase;

converter B, in which positive side DC current IDBP flows, is connected to the W-phase; and converter D, in which positive side DC current IDDP flows, is connected to the W-phase.

That is, current balance control circuit 58 generates conduction instructions IUA to IZD to unit converters A to D as follows:

IUA is made "1", and IVA, IWA are made "0";

IWC is made "1", and IUC, IVC are made "0";

IWB is made "1", and IUB, IVB are made "0"; and

IWD is made "1", and IUD, IVD are made "0".

Consequently, as shown at "A" in FIG. 4, voltage VU is applied to positive DC voltage VDAP, causing voltage VLAP to become smaller, and decreasing positive side DC current IDAP.

At a time point t5, IWX changes from 3 to 2. At this point, IUX is 1. Consequently, the conduction number of the U-phases of converters A to D is 1, and the conduction number of the W-phases of converters A to D is 2. The multiple number of converters A to D is 4, and the total of the conduction number of the U-phase and conduction number of the W-phase is 3, so the conduction number of the V-phases is 1.

The order of the magnitudes of AC voltages VU, VV and VW at this point is then:

VU>VW>VV

Also, the order of the magnitudes of positive side DC currents IDAP to IDDP is:

IDAP>IDCP>IDBP>IDDP,

Likewise at time point t4,

Converter A, in which positive side DC current IDAP flows, is connected to the U-phase;

Converter C, in which positive side DC current IDCP flows, is connected to the W-phase; Converter B, in which positive side DC current IDBP flows, is connected to the W-phase; and converter D, in which positive side DC current IDDP flows, is connected to the V-phase.

That is, current balance control circuit 58 generates conduction instructions IUA to IZD as follows:

IUA is "1", and IVA, IWA are made "0";

IWC is made "1" and IUC, IVC are made "0";

IWB is made "1" and IUB, IVB are made "0"; and

IVD is made "1" and IWD, IUD are made "0";

Consequently, as shown at "B" of FIG. 4, voltage VV is applied to positive DC voltage VDDP, causing voltage VLDP to become larger, and positive side DC current IDDP to increase. The same action is performed during the period from time point t5 to time point t6.

By exercising control in the same way in the period of each 60° of the other periods, following the period from time point t3 to time point t6, output signals IUA, IVA, IWA, IXA, IYA, IZA, IUB, IVB, IWB, IXB, IYB, IZB, IUC, IVC, IWC, IXC, IYC, IZC, IUD, IVD, IWD, IXD, IYD and IZD of current balance control circuit 58 become as shown in FIG. 3. Specifically, arms U, V, W, X, Y and Z of converter A are controlled by signals IUA, IVA, IWA, IXA, IYA and IZA, respectively. Arms U, V, W, X, Y and Z of converter B are controlled by signals IUB, IVB, IWB, IXB, IYB and IZB, respectively. Arms U, V, W, X, Y and Z of converter C are controlled by signals IUC, IVC, IWC, IXC, IYC and IZC, respectively. Arms U, V, W, X, Y and Z of converter D are controlled by signals IUD, IVD, IWD, IXD, IYD and IZD, respectively.

A current IU shown in FIG. 3 is the total value of the U-phase currents of converter A, converter B, converter C and converter D obtained by control asabove. It is found that as current IU, a current whose waveforms is like a sine waveform is obtained that tracks instruction value RIU of the U-phase current. Though not shown in FIG. 3, the same applies to V-phase current IV and W-phase current IW. To facilitate understanding of the operation of this invention, the deviations of the positive side DC currents IDAP to IDDP with respect to the mean value are shown multiplied by a factor of 20. As can be found in FIG. 4, good balance control is achieved. Balance control can be likewise exercised in respect of the negative side DC currents IDAN to IDDN by current balance control circuit 58, in which negative side D6 currents IDAN to IDDP are used for balance control instead of positive side DC currents IDAP to IDDP as described above.

In the embodiment described above, balance control of the DC current is performed at the timing at which one of instruction values IUX, IVX, IWX of the conduction numbers of each phase changes. But, if balance control is exercised also when the deviation of the DC current exceeds a fixed limiting value, in addition at the timing at which one of instruction values IUX, IVX or IWX changes, the deviation of the DC current can be further reduced.

Hereinbelow a power conversion system according to another embodiment of this invention is described with reference to FIG. 5 and FIG. 6, in which balance control is also carried out when the deviation of the DC current exceeds a fixed limit value. In these Figures, symbols which are the same as corresponding symbols in FIG. 3 and FIG. 4 indicate the same items, so repeated description is omitted. FIG. 5 and FIG. 6 show the operational waveforms of different parts of unit converters A to D at the same timing from a time point t11 to a time point t12 . The operation of this another embodiment of this invention will now be described with reference to FIG. 1, FIG. 2, FIG. 5 and FIG. 6.

In these Figures, in the period from a time point t13 to a time point t16, the absolute value of V-phase current instruction value RIV is a maximum and V-phase current instruction value RIV is negative just as in the period from time point t3 to time point t6 in FIG. 3 and FIG. 4. Consequently, by making signals IYA, IYB, IYC, IYD "1" with the timing at which signal IWX or signal IUX changes, arm Y of converter A, arm Y of converger B, arm Y of converter C and arm Y of converter D conduct.

(3) DC balance control when the instruction value of the conduction number changes At a time point t14, IUX changes from 2 to 3. At this point, IWX is 1. Consequently, the conduction number of U-phases of converters A to D is 3, while the conduction number of W-phases of converters A to D is 1. The multiple number of converters A to D is 4 and the total of the conduction number of the U-phase and conduction number of the W-phase is 4, so the conduction number of the V-phase is 0.

At this point, the order of the magnitudes of AC voltages VU, VV and VW is:

VU>VW>VV.

Also, the order of the magnitudes of positive side DC currents IDAP to IDDP is:

IDBP>IDDP>IDAP>IDCP

Balance control of the DC currents can be achieved by making connection from the converter of largest DC current to the phase of largest AC voltage, in order, in accordance with the instruction values of the conduction numbers for each phase. So:

converter B, in which positive side DC current IDBP flows, is connected to the U-phase;

converter D, in which positive side DC current IDDP flows, is connected to the U-phase;

converter A, in which positive side DC current IDAP flows, is connected to the U-phase; and converter C, in which positive side DC current IDCP flows, is connected to the W-phase.

That is, current balance control circuit 58 generates conduction instructions IUA to IZD as follows:

IUB is made "1", and IVB, IWB are made "0";

IUD is made "1", and IVD, IWD are made "0";

IUA is made "1", and IVA, IWA are made "0"; and

IWC is made "1", and IUC, IVC are made "0".

Consequently, as shown at "C" in FIG. 6, voltage VW is applied to positive DC voltage VDCP, causing voltage VLCP to become larger, and positive side DC current IDCP to increase.

(4) DC current balance control when the deviation of the DC current exceeds a limit value When, at a time point t15, the deviation of positive side DC current IDCP exceeds the limit value, which is detected by current balance control circuit 58. Based on this detection, current balance control circuit 58 controls unit converters A to D as follows. At this point, IUX is 3 and IWX is 1. Consequently, the conduction number of U-hases of converters A to D is 3 and the conduction number of W-phases of converters A to D is 1. Since the multiple number of converters A to D is 4 and the sum of the conduction number of the U-phase and conduction number of the W-phase is 4, the conduction number of the V-phase is 0.

At this point, the order of the magnitudes of AC voltages VU, VV, VW is:

VU>VW>VV

Also, the order of the magnitudes of positive side DC currents IDAP to IDDP is:

IDCP>IDBP>IDDP>IDAP

Balance control of the DC current can be achieved by making connection from the converter of largest DC current to the phase of largest AC voltage, in order, in accordance with the instruction values of the conduction numbers of each phase. So:

converter C, in which positive side DC current IDCP flows, is connected to the U-phase;

converter B, in which positive side DC current IDBP flows, is connected to the U-phase;

converter D, in which positive side DC current IDDP flows, is connected to the U-phase; and converter A, in which positive side DC current IDAP flows, is connected to the W-phase.

That is current balance control circuit 58 generates conduction instructions IUA to IZD as follows:

IUC is made "1", and IVC, IWC are made "0";

IUB is made "1", and IVB, IWB are made "0";

IUD is made "1", and IVD, IWD are made "0"; and

IWA is made "1", and IUA, IVA are made "0".

Figure 8:
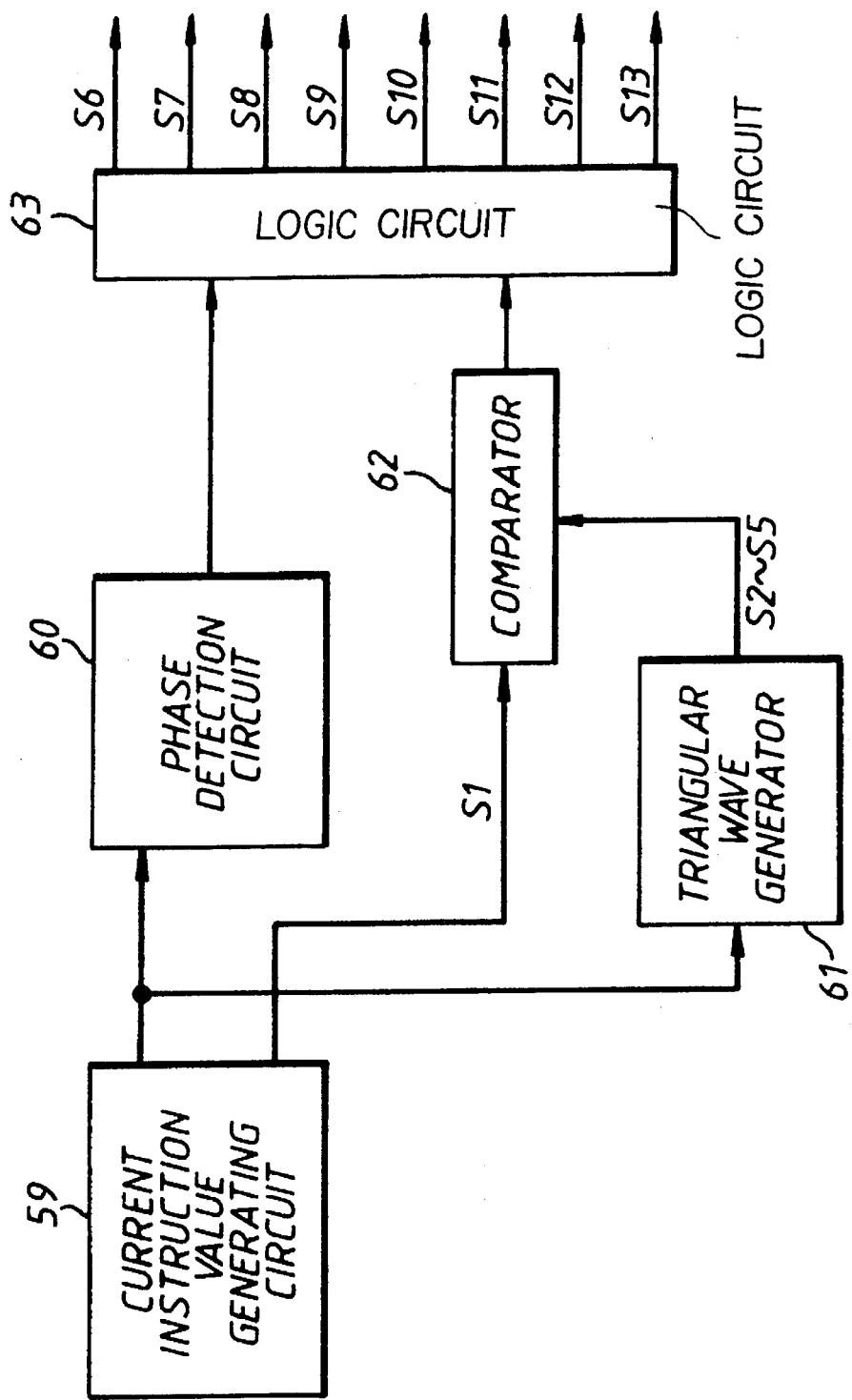
FIG. 8 is a layout diagram of a control circuit which performs control of the main circuit of FIG. 7.

Consequently as shown at "D" in FIG. 8, voltage VU is applied to positive DC voltage VDCP, causing voltage VLCP to become smaller and positive side DC current IDCP to be decreased. The same operation is performed during the period from time point t15 to time point t16. Next, subsequent operation is exercised in the same way in the period of each 60° of periods, following the period from time point t13 to time point t16.

Thus, by exercising DC current balance control also in the case where the deviation of one of positive side DC currents IDAP to IDDP exceeds a limit value, balance control of positive side DC currents IDAP to IDDP can be achieved with a smaller deviation than in the case of FIG. 4. Balance control can be carried out in the same way for negative side DC currents IDAN to IDDN.

It should be noted that, although in the above description, as one example, the explanation was given for the case where four unit converters were operated in parallel, the invention could likewise be put into practice also in the case where a plural number of unit converters other than four are operated in parallel.

The calculation processes performed by each of these units or circuits are executed by a microprocessor, as described above. It is very easy to prepare programs for the calculations for those skilled in the art based on the detailed description of the units or circuits. So the detailed description of the programs for the calculations may be omitted.

As described above, with this invention, every time the number of conduction arms is changed, the DC current values of each unit converter, and AC voltages of each phase are arranged in order of magnitude, respectively, and on/off control of the switching devices in each unit converter is exercised in accordance with these arrangement orders and the number of conduction arms in each phase at that point. Thanks to the adoption of a construction as above, current balance can be obtained even using only a single DC power source device. This enables the power source circuitry to be simplifed.

Obviously, numerous modifications and variations of the present invention are possible in light of the above teachings. It is therefore to be understood that within the scope of the appended claims, the invention may be practiced otherwise than as specifically described herein.

What is claimed is:

1. A power conversion system, comprising:

a DC power source;

a plurality of unit converters; each being composed of a bridge connected switching devices for converting a DC power to an AC power;

a plurality of DC reactors; each being provided between said DC power source and one of said unit converters, respectively;

each of said unit converters having DC terminals connected to said DC power source through one of said DC reactors, respectively, and having AC terminals of each phase;

said AC terminals of each phase of said unit converters being connected in common and being adapted for connecting to an AC load; and control means including, current instruction value generating means for generating current instruction values of each phase for AC output currents of each phase of said power conversion system, AC voltage detection means for detecting AC output voltages of each phase of said power conversion system, DC current detection means for detecting a plurality of DC currents, each flowing between said DC power source and one of said unit converters, respectively, conduction arm number calculating means for determining conduction arm numbers of said unit converters of each phase, each being determined based on a ratio of said current instruction value of respective phase and a mean value of said DC currents, and current balance control means connected to receive said conduction arm numbers from said conduction arm number calculating means, said AC output voltages from said AC voltage detection means, and said DC currents from said DC current detection means, for generating a plurality of conduction instructions for said switching devices at a time of change of one of said conduction arm numbers based on a first order of magnitude of said AC voltages, a second order of magnitude of said DC currents and said conduction arm numbers of each phase at that point;

said conduction instructions being applied to said unit converters for switching ON or OFF said switching devices;

thereby balance control of said DC currents of said unit converters being exercised.

2. The power conversion system according to claim 1, wherein:

said current balance control means further calculates a plurality of deviations of said DC currents and generates said conduction instructions for said switching devices at a time when one of said deviations of said DC currents exceeds a prescribed limit value.

3. The power conversion system according to claim 1 or claim 2, wherein:

each of said unit converters includes a three-phase GTO converter; and said AC load is a three-phase AC load.

4. The power conversion system according to claim 3, wherein said control means further includes:

current phase detection means for detecting a maximum phase out of said three phases during a predetermined time period in which one of said absolute values of said current instruction values is maximum, and for generating said maximum phase and a polarity of said current instruction value of said maximum phase; and wherein said current balance control means is further connected to receive said maximum phase and said polarity from said current phase detection means and further generates said conduction instructions for said switching devices based on said maximum phase and said polarity during said predetermined time.

5. The power conversion system according to claim 4, wherein:

each of said DC reactor includes a positive side DC reactor and a negative side DC reactor;

each of said unit converters has said DC terminals including a positive DC terminal and a negative DC terminal, said positive DC terminal being connected to said DC power source through said positive side DC reactor and said negative DC terminal being connected to said DC power source through said negative side DC reactor;

said DC current detection means detects said DC currents, each of said DC currents including a positive side DC current flowing between said power source and said positive DC terminal of one of said unit converters, and a negative side DC current flowing between said power source and said negative DC terminal of one of said unit converters, respectively;

said current balance control means receives as said DC currents ones of said positive side DC currents and said negative side DC currents, and generates said conduction instructions based on one of said second order of magnitude of said positive side DC currents and said second order of magnitude of said negative side DC currents as said second order of magnitude of said DC currents.

* * * * *